(12) United States Patent
Diemel

(10) Patent No.: US 10,477,993 B2
(45) Date of Patent: Nov. 19, 2019

(54) LIGHT ENGINE FOR A MIRROR

(71) Applicant: Kohler Co., Kohler, WI (US)

(72) Inventor: Doug Diemel, Kohler, WI (US)

(73) Assignee: KOHLER CO., Kohler, WI (US)

(*) Notice: Subject to any disclaimer, the term of this patent is extended or adjusted under 35 U.S.C. 154(b) by 92 days.

(21) Appl. No.: 15/863,409

(22) Filed: Jan. 5, 2018

(65) Prior Publication Data

US 2019/0208928 A1 Jul. 11, 2019

(51) Int. Cl.
*A47G 1/00* (2006.01)
*F21V 8/00* (2006.01)

(52) U.S. Cl.
CPC .............. *A47G 1/00* (2013.01); *G02B 6/009* (2013.01); *G02B 6/0068* (2013.01); *G02B 6/0083* (2013.01); *G02B 6/0088* (2013.01); *G02B 6/0091* (2013.01)

(58) Field of Classification Search
CPC ..... F21V 33/004; A47G 1/00; A47G 2200/08; F21W 2131/302
USPC .......................... 362/128, 135, 143, 492, 494
See application file for complete search history.

(56) References Cited

U.S. PATENT DOCUMENTS

| | | | |
|---|---|---|---|
| 5,184,888 A * | 2/1993 | Sakuma | B60J 3/0282 296/97.2 |
| 6,264,353 B1 | 7/2001 | Caraher et al. | |
| 6,539,657 B1 | 4/2003 | Qualls, Jr. et al. | |
| 7,663,798 B2 | 2/2010 | Tonar et al. | |
| 8,033,698 B2 | 10/2011 | Boivin et al. | |
| 8,465,161 B2 | 6/2013 | Dewind et al. | |
| 8,529,113 B2 | 9/2013 | Brown et al. | |
| 8,793,909 B1 | 8/2014 | Cole | |
| 8,910,402 B2 * | 12/2014 | Mischel, Jr. | G09F 9/00 312/227 |
| 9,505,349 B2 | 11/2016 | Fish, Jr. et al. | |
| 2004/0052084 A1 | 3/2004 | Lin | |
| 2006/0242867 A1 | 11/2006 | Choi | |
| 2007/0211452 A1 * | 9/2007 | Gaunce | A47G 1/02 362/135 |
| 2011/0283577 A1 | 11/2011 | Cornelissen et al. | |
| 2012/0307490 A1 | 12/2012 | Ellis | |

(Continued)

FOREIGN PATENT DOCUMENTS

| | | |
|---|---|---|
| DE | 102013000504 | 7/2014 |
| EP | 1875837 | 1/2008 |

(Continued)

*Primary Examiner* — William N Harris
(74) *Attorney, Agent, or Firm* — Foley & Lardner LLP

(57) ABSTRACT

A mirror includes a glass layer having a front surface and a rear surface and a reflective layer disposed on the rear surface of the glass layer. The reflective layer includes a first opening exposing the rear surface inward of a first boundary. The mirror also includes a mounting structure for a lighting assembly affixed to the rear surface that includes a surface substantially enclosing a volume and a housing attached to the surface and disposed within the volume. The mirror also includes a light source affixed to a first surface of the housing. The mirror also includes a light guide affixed to a second surface of the housing by a section of compressible foam, the section of compressive foam having a first adhesive layer affixed to the housing and a second adhesive layer affixed to the light guide. A first end surface of the light guide is proximate to the light source.

20 Claims, 7 Drawing Sheets

(56) References Cited

U.S. PATENT DOCUMENTS

| | | |
|---|---|---|
| 2014/0016353 A1* | 1/2014 | Chang .................... A47G 1/02 |
| | | 362/612 |
| 2014/0196328 A1 | 7/2014 | Swartz |
| 2015/0177450 A1* | 6/2015 | Ahn .................... G02B 6/0088 |
| | | 362/606 |
| 2015/0177451 A1* | 6/2015 | Kang ................ G02F 1/133308 |
| | | 362/606 |
| 2016/0018589 A1* | 1/2016 | Ha ...................... G02B 6/0088 |
| | | 362/606 |
| 2016/0327787 A1 | 11/2016 | Mischel, Sr. et al. |
| 2016/0341415 A1 | 11/2016 | Lumaye et al. |
| 2019/0107275 A1* | 4/2019 | Thomas ................ F21V 33/004 |

FOREIGN PATENT DOCUMENTS

| | | |
|---|---|---|
| EP | 2327340 | 11/2010 |
| WO | WO 2013009006 | 1/2013 |

* cited by examiner

LIGHT ENGINE FOR A MIRROR

BACKGROUND

The present application relates generally to mirrors that include lighting features for use in bathroom and other environments.

Individuals generally rely on ambient lighting or external lighting sources to enlighten a room containing a mirror. Such an arrangement may result in a sub-par reflection due to a lack of agreement between the directionality of the light source (e.g., from a ceiling), and the direction of reflections from the mirror (e.g., outward from a wall or other surface on which the mirror is mounted). For example, certain features in a reflected image may receive more lighting from an external lighting source than others, resulting in de-emphasized features or undesirable shadowing in the reflected images.

It may therefore be advantageous to include lighting features as part of a mirror assembly. The present application discusses an improved mirror that includes lighting features and a method for assembling such a mirror.

SUMMARY

One embodiment relates to a method for assembling a mirror including a lighting assembly including securing a light guide to a housing with a compressive foam having an adhesive applied thereto such that a first end of the light guide is proximate to a light source, providing a mirror including a first portion and a second portion, wherein the first portion has a first reflectivity and the second portion has a second reflectivity, the first reflectivity being higher than the second reflectivity, and attaching the housing to the mirror, wherein attaching the housing to the mirror includes pressing a peripheral portion of the light guide to a boundary region of the first portion, thereby placing the compressive foam into a compressed state such that a relative positioning of the light guide and the light source changes.

Another embodiment relates to a mirror. The mirror includes a glass layer having a front surface and a rear surface. The mirror also includes a reflective layer disposed on the rear surface of the glass layer, wherein the reflective layer includes a first opening exposing the rear surface inward of a first boundary. The mirror also includes a mounting structure for a lighting assembly disposed rearward of the rear surface, the mounting structure including a surface substantially enclosing a volume. The mirror also includes a housing attached to the surface and disposed within the volume. The mirror also includes a light source affixed to a first surface of the housing. The mirror also includes a light guide affixed to a second surface of the housing by a section of compressible foam, the section of compressible foam having a first adhesive layer affixed to the housing and a second adhesive layer affixed to the light guide, wherein a first end surface of the light guide is proximate to the light source.

Another embodiment relates to a mirror. The mirror includes a reflective portion, a first transparent portion, a second transparent portion, first and second housings affixed to a rear surface of the mirror, light sources attached to the first and second housings, light guides attached to the first and second housings such that portions of front surfaces of the light guides align with the first and second transparent portions, and sections of compressive foam disposed between the light guides and surfaces of the first and second housings, where the front surfaces of the light guides abut against the rear surface of the mirror to compress the foam.

DETAILED DESCRIPTION

Referring generally to the FIGURES, described herein is a lighting assembly for a mirror. The lighting assembly includes a light source and a light guide. Both the light source and the light guide are attached to a housing. In various embodiments, the light source is attached to a first surface of the housing and the light guide is attached to a second surface of the housing such that the light guide extends away from the light source in a lengthwise direction from a first end thereof. The first end of the light guide is disposed proximate to the light source such that light emitted from the light source travels through the light guide in the lengthwise direction and emerges in a substantially uniform direction from a front surface of the light guide. The housing is positioned on a rear surface of a mirror such that, upon emergence from the front surface of the light guide, light from the light source traverses a transparent portion of the mirror to illuminate an imaging area of the mirror.

Various aspects of the mirror and light guide are designed to optimize the characteristics of light emanating from the mirror. For example, in various embodiments, the light guide is attached to the second surface of the housing with portions of compressive foam having adhesive applied thereto. Upon attachment of the housing to the rear surface of the mirror, peripheral portions of the front surface of the light guide press against the rear surface of the mirror so as to place the foam into a compressed state. This results in a tight seal between the light guide and the mirror, which minimizes leakage of light at an interface between the light guide, and thus maximizes the output of the lighting assembly.

In another aspect, reflective material may be disposed around selected portions of an outer surface of the light guide so as to maximize an amount of light directed to the front surface of the light guide. In some embodiments, reflective film is placed at peripheral portions of the front surface of the light guide that are aligned with non-transparent regions of the mirror. In an additional aspect, the transparent portion of the mirror may include a frosted border region so as to provide an appearance of an even, white light in the totality of the transparent portion. As such, the embodiments disclosed herein provide for an efficient lighting assembly for a mirror that provides light having a desirable appearance.

Figure 1:
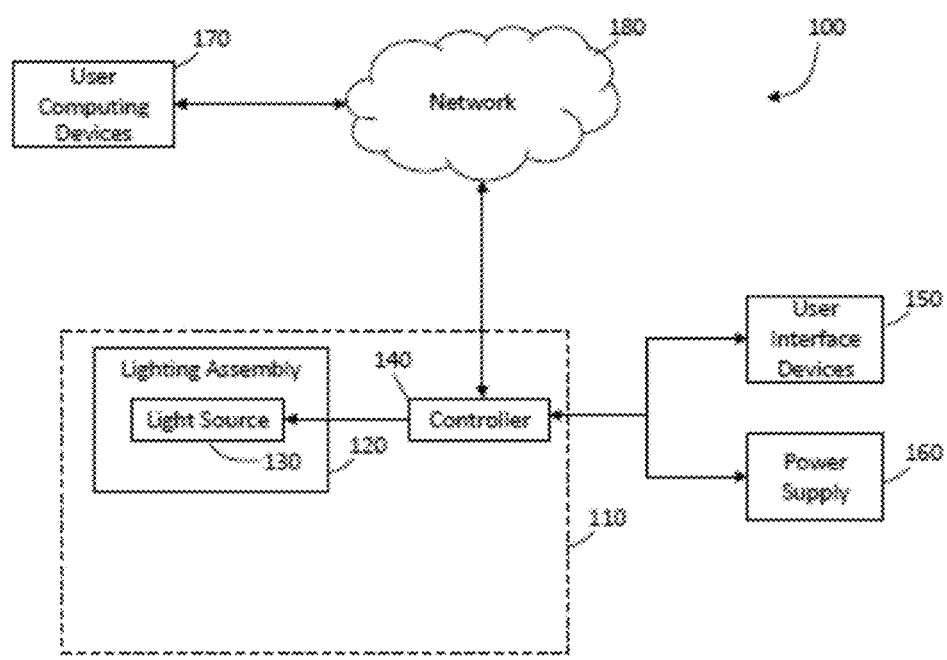
FIG. 1 is a block diagram of an environment of a mirror with a lighting assembly, according to an example embodiment.

Referring now to FIG. 1, a block diagram of an environment 100 of a mirror 110 including a lighting assembly 120 is shown, according to an example embodiment. As described herein, the mirror 110 includes a reflective portion and at least one transparent portion with a lesser reflectivity than the reflective portion. Example embodiments of the mirror 110 will be described in more detail with respect to FIGS. 2-3. The lighting assembly 120 includes a housing and a light source 130. Example embodiments of the housing and light source 130 are described with respect to FIGS. 4-7. In various embodiments, the lighting assembly 120 includes an edge-lit light guide and the light source 130 is mounted with respect to an end face of the light guide. As a result, an evenly-distributed luminous flux is emitted from a front surface of the light guide. The light guide is aligned with at least a portion of a transparent portion of the mirror 110 such that the luminous flux is emitted to an area of interest (e.g., an imaging area of the mirror 110).

In various embodiments, the light source 130 includes an array of light emitting diodes (LEDS). For example, in one embodiment, the light source 130 is a uniform (e.g., linear) array of white light-emitting LEDS emitting light having a fixed correlated color temperature (CCT). In other embodiments, the CCT of the emitted luminous flux is adjustable. In some embodiments, the light source 130 includes a number of individually-driven of multicolor LEDS rendering an overall color of the emitted luminous light adjustable by the user. In some embodiments, the light source 130 emits a luminous flux of approximately 1300 lumens.

Facilitating the operations of the light source 130 are a controller 140, user interface devices 150, and a power supply 160. The power supply 160 may include any power source. For example, in some embodiments, the power supply 160 is inserted into a wall outlet or jack of a room in which the environment 100 is situated to provide a constant voltage to the controller 140. In some embodiments, the power supply delivers between 1 and 40 watts of power to the controller 140. In other embodiments, the power supply 160 includes a battery.

The controller 140 is communicably coupled to the light source 130 and configured to provide control signals to individual elements (e.g., LEDS) of the light source 130 to control an overall light output of the light source 130. For example, in some embodiments, the controller 140 provides signals to various LEDS of the light source 130 that control the dimming of the LEDS via pulse-width modulation (PWM). In some embodiments, the controller 140 is a multi-channel device enabling aspects (e.g., color, CCT, etc.) of the luminous flux emitted via the light source 130 to be adjusted. For example, in one embodiment, the CCT of light emitted from the lighting assembly 120 is adjustable between 2200 k and 6500 k. In some embodiments, the color rending index of the lighting assembly 120 is approximately 90, providing a fixed or adjustable CCT output at a power rating of greater than 45 lumens/watt.

Adjustments to the light output by the light source 130 may be made via user interface devices 150. User interface devices 150 may include any means (e.g., knob, switch, touchscreen, touch-sensitive panel, microphone, proximity sensor, etc.) through which a user may provide a sensible input to the controller 140. For example, in one embodiment, the user interface devices 150 include a dimming switch through which the user may provide inputs to cause the controller 140 to increase or decrease the brightness of light emitted via the light source 130.

In some embodiments, the controller 140 includes a communications transceiver (e.g., a network interface) configured to exchange data via a network 180. The network 180 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 180 includes the internet. As such, various user computing devices 170 may communicate with the controller 140 via establishing a connection to the network 180. Examples of the user computing devices 170 include personal computers such as a desktop or laptop computer, smartphones, tablets, wearable computing devices such as smartwatches, smart appliances such as a smart speaker, and the like.

In various embodiments, user computing devices 170 include processors and non-transitory storage mediums housing one or software applications configured to enable the user computing device 170 to exchange data, commands, and instructions to the controller 140 via the network 180. In an example, via such an application on a smartphone, a user may view the current operational status of the lighting assembly 120 (e.g. whether the light source 130 is turned on) and provide commands to remotely control (e.g., turn the light source 130 on, adjust the color or dimming, etc.) the light source 130. As such, the controller 140 provides flexibility in terms of the means through which the output of the lighting assembly 120 may be controlled.

Figure 2:
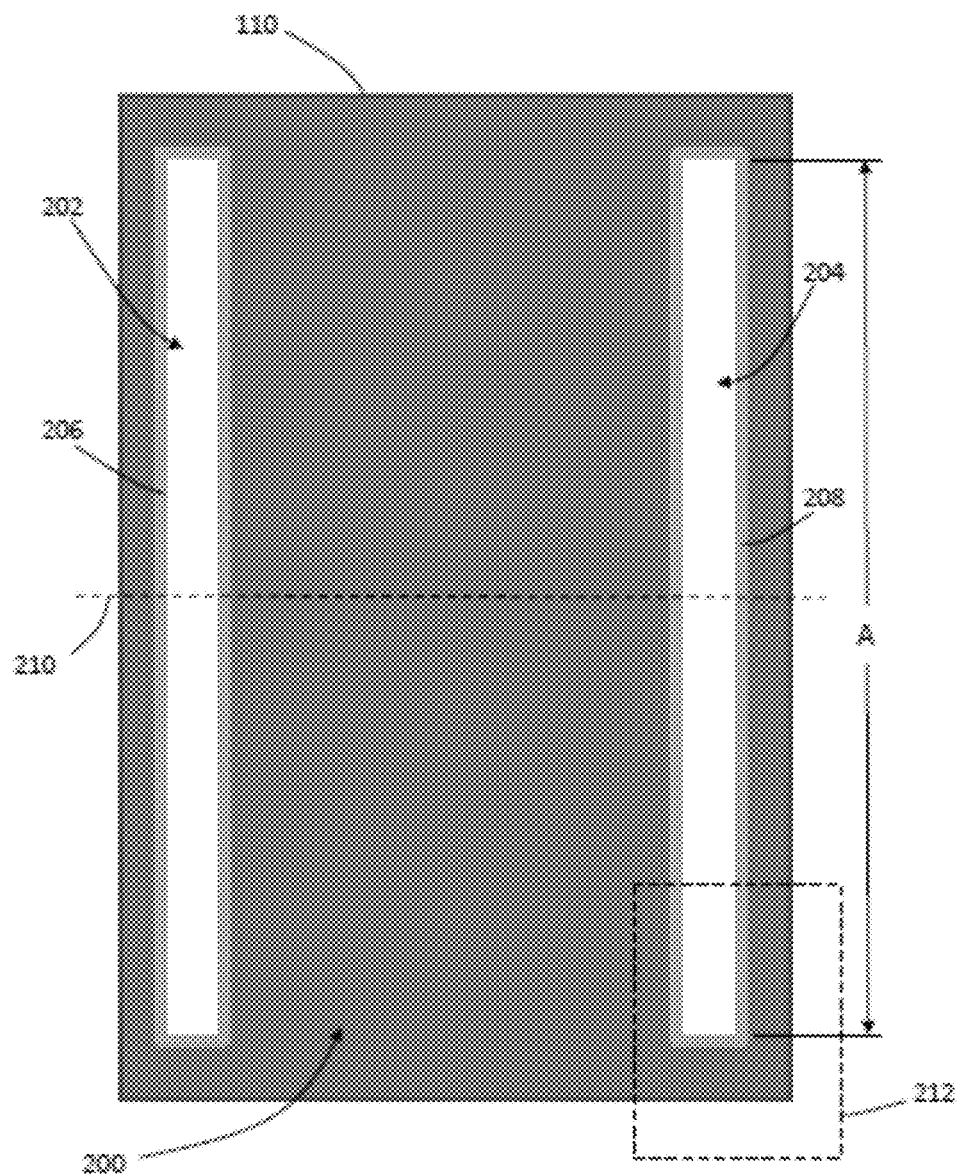
FIG. 2 is a perspective view of a mirror including portions with reduced reflectivity for the positioning of lighting assemblies, according to an example embodiment.

Referring now to FIG. 2, a front perspective view of the mirror 110 described with respect to FIG. 1 is shown, according to an example embodiment. As shown, the font surface of the mirror 110 includes a reflective portion 200, a first transparent portion 202, and a second transparent portion 204. The reflective portion 200 has a reflectivity that is greater than that of the first and second transparent portions 202 and 204. For example, in some embodiments, the first and second transparent portions 202 and 204 are formed via performing various processing steps on a rear surface of the mirror 110 to remove, for example, regions of back paneling and reflective coating therefrom to expose a transparent glass layer. The removed regions have circumferential boundaries corresponding to those of the first and second transparent portions 202 and 204 so as to form transparent windows corresponding to the first and second transparent portions 202 and 204. It should be understood that, in various other example embodiments, the mirror 110 may include more, less, or differently configured transparent portions. For example, in one particular exemplary embodiment, the mirror 110 includes a single transparent portion extending horizontally proximate to a bottom edge of the mirror 110.

In some embodiments, additional processing is performed on the transparent glass layer in the regions corresponding to the first and second transparent portions 202 and 204. For example, in some embodiments, border regions 206 and 208 of the exposed regions of the transparent glass layer are roughened so as to create frosted borders extending around at least portions of outer circumferences of the first and second transparent portions 202 and 204. In some embodiments, a film or guide is applied the rear surface of the mirror 110. The film or guide may have openings therein in an arrangement corresponding to desired locations of the border regions 206 and 208. In other words, the film or guide covers regions surrounding desired locations for the border regions 206 and 208. With the film or guide in place, the area of the mirror 110 covered by the film or guide undergoes a roughening process (e.g., via bead blasting, sand blasting, or another abrasion process). The film or guide protects to covered regions. As such, only the locations corresponding to desired positions for the border regions 206 and 208 are roughened. Using this process, frosted regions having clean boundaries and any desired shape may be formed.

In the example shown, the transparent portions 202 and 204 are substantially rectangular and offset from edges of the mirror 110. Additionally the transparent portions 202 and 204 are of a lesser dimension (e.g., height) than the mirror 110. As shown, upper and lower boundaries of the border regions 206 and 208 are separated by a distance A. In one embodiment, A is approximately 26 inches, while the overall height of the mirror 110 is greater than 26 inches (e.g., 30 inches). In some embodiments, the transparent portions 202 and 204 are sized based on a desired amount of light to be emitted via lighting assemblies disposed behind the transparent portions 202 and 204. For example, transparent portions 202 and 204 may be sized larger (e.g., such that circumferential edges thereof are closer to outer edges of mirror 110) in applications where more light is desired than in other cases. The transparent portions 202 and 204 are centered relative to a central axis 210 of the mirror 110. Border regions of the reflective portion 200 are disposed between outer circumferences of first and second transparent portions 202 and 204 and circumferential edges of the mirror 110. It should be understood that, in various alternative embodiments, the transparent portions 202 may be offset from the central axis 210.

Figure 3:
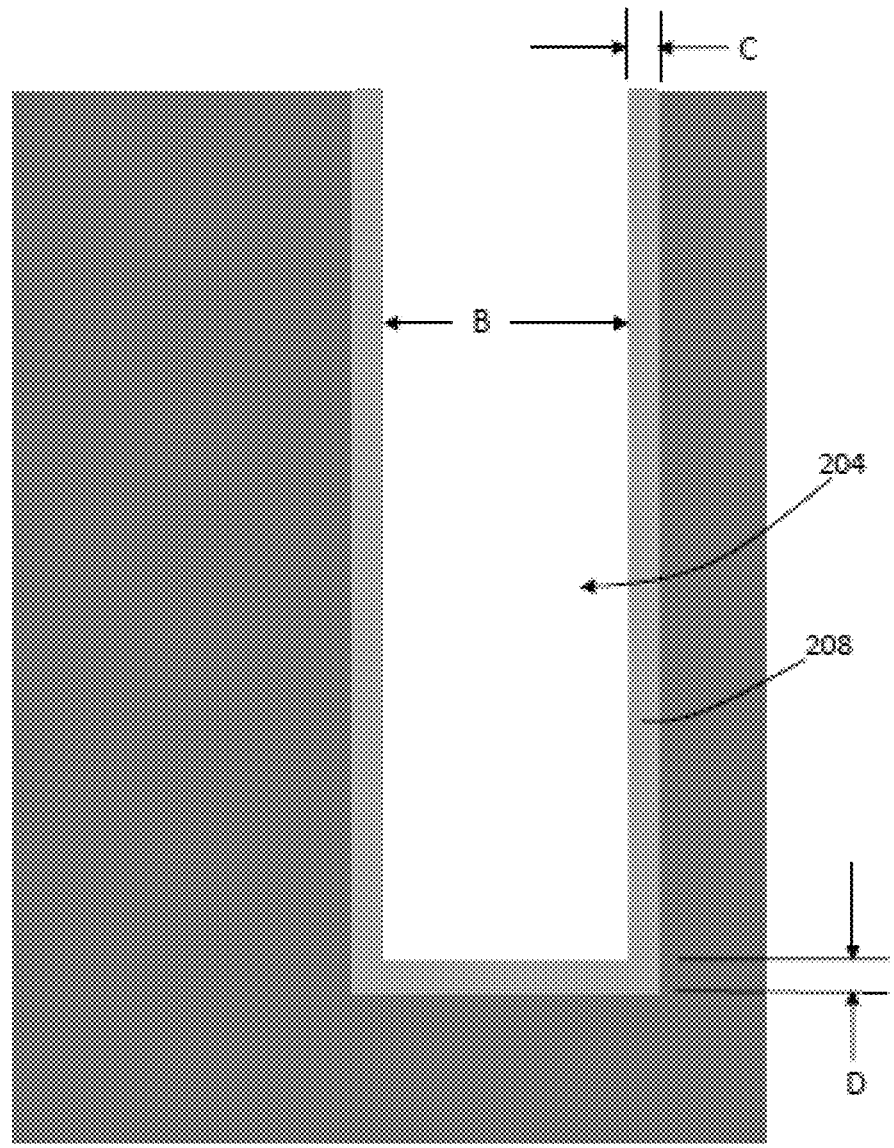
FIG. 3 is a close-up view of a portion of the mirror shown in FIG. 2.

Turning now to FIG. 3, a close-up view of a region 212 of the mirror 110 described with respect to FIGS. 1-2 is shown, according to an example embodiment. As shown, the second transparent portion 204 is substantially rectangular-shaped and includes a transparent region with a width B between inner boundaries of the border region 208. In one embodiment, B is approximately 1.4 inches (e.g., 1.38 inches). Also as shown, portions of the border region 208 extending in a direction substantially perpendicular to the central axis 210 have a thickness C and portions of the border region 208 extending in a direction substantially parallel to the central axis 210 have a thickness D. In some embodiments, C is substantially equal to D such that the border region 208 has a uniform thickness around the entire circumference thereof. For example, in one embodiment, C and D are approximately 0.12 inches such that the entire transparent portion 204 has a total width (e.g., including the transparent region and the border region 208) of approximately 1.6 inches. In various alternative embodiments, C and D are not equal to one another, and any portion of the border region 208 may be of a different thickness than the others.

Once the mirror 110 is processed to include one or more transparent portions (such as the transparent portions 202 and 204 described with respect to FIGS. 2-3), one or more lighting assemblies is installed at a rear surface of the mirror 110. As described herein, such lighting assemblies include light sources and an edge-lit light guide. The light sources are disposed near ends of the light guides. The light guides disperse light emanating from the light sources such that a substantially uniform luminous flux is emitted front surfaces of the light guides. In various embodiments, the front surfaces of the light guides are substantially aligned with the transparent portions of the mirror, such that luminous flux emanating therefrom is incident on objects placed in front of the reflective portion 200 of the mirror, thereby enhancing aspects of the reflected image produced by the mirror.

Figure 4:
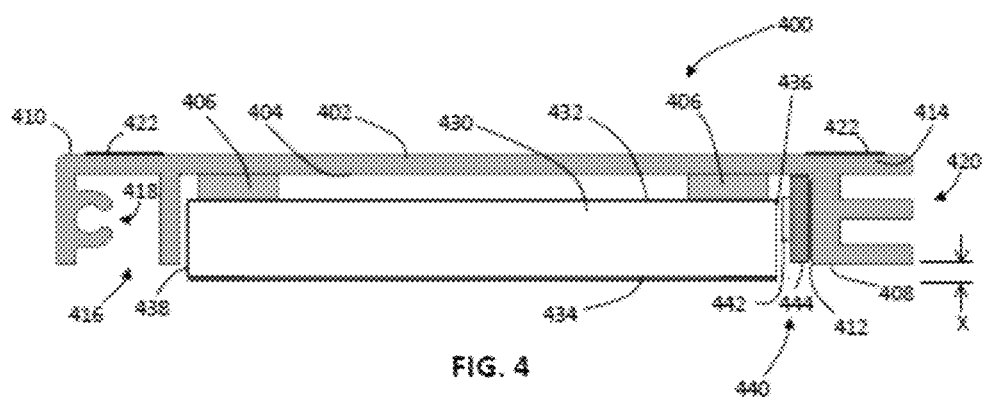
FIG. 4 is a perspective view of a lighting assembly for a mirror, according to an example embodiment.

Referring now to FIG. 4, a perspective view of a lighting assembly 400 for a mirror is shown, according to an example embodiment. As shown, the lighting assembly 400 includes a housing 402, a light guide 430, and a light source 440. In some embodiments, the housing 402 is constructed of aluminum, although according to other example embodiments, other materials may be used. The light guide 430 is attached to a first surface 404 of the housing 402 via sections of compressive foam 406. In one embodiment, the surface 404 is substantially planar and, upon attachment to a mirror (e.g., the mirror 110 described with respect to FIG. 2), extends in a direction substantially parallel to a central axis (e.g., the central axis 210) of the mirror. In the example shown, the sections of compressive foam 406 are substantially parallelepiped-shaped (e.g., having a width of approximately 12 mm and a thickness of approximately 2 mm, although such dimensions may vary in other embodiments) and have adhesive applied to opposing surfaces thereof. One of these opposing surfaces is affixed to the surface 404 of the housing 402 and another is applied to a rear surface 432 of the light guide 430. In the example shown, two sections of compressive foam 406 are disposed proximate to ends of the light guide 430 are used to attach the light guide 430 to the housing 402. According to other exemplary embodiments, one or both of the opposing surfaces do not have an adhesive applied thereto, and may simply be sandwiched between the housing 402 and the light guide 430.

In an example, the sections of compressive foam 406 share a dimension (e.g., height) with the light guide 430 such that they substantially cover regions of the rear surface 432. Such a configuration maximizes the common surface area between the housing 402 and the sections of compressive foam 406 to provide a strong adhesive connection. However, other embodiments are envisioned. For example, in one example embodiment, the sections of compressive foam 406 are smaller in dimension (e.g., the sections of compressive foam 406 may include sections having heights less than the overall height of the light guide 430), and a plurality thereof are aligned proximate to the ends of the light guide 430. In another example embodiment, a single section of compressive foam of comparable dimensions to the light guide 430 covers substantially all of the rear surface 432 of the light guide 430. In some embodiments, sections of compressive foam 406 are constructed of a closed cell acrylic foam. However, it should be understood that other materials, having either an open or a closed cell design, may be used in various alternative embodiments.

As shown in FIG. 4, when the housing 402 is not coupled to a mirror or any additional surface, the sections of compressive foam 406 are in an uncompressed state. As a result, there is an offset between a front surface 434 of the light guide 430 and a front surface 408 of the housing 402 having a thickness X. In an example embodiment, a rear surface 410 of the housing 402 is separated from the font surface 408 by approximately 8.5 mm (e.g., 8.7 mm) and the offset between the front surface 434 of the light guide 430 and the front surface 408 is approximately 2 mm. As a result, in one embodiment, the entirety of the lighting assembly 400 has a thickness (e.g., a distance between the front surface 434 of the light guide 430 and the rear surface 410 of the housing 402) of approximately 10.5 mm prior to installation.

Once the lighting assembly 400 is installed on a mirror or other surface, at least a portion of the front surface 434 of the light guide 430 is pressed against the mirror (e.g., at a rear surface of a transparent portion thereof) so as to compress the sections of compressive foam 406. As a result of the compression, the offset between the front surface 434 of the light guide 430 and the front surface 408 of the housing 402 is reduced. In various embodiments, the offset is reduced by more than a third. For example, in one embodiment, the offset is reduced by approximately 1 mm such that the entirety of the lighting assembly 400 has a thickness of approximately 9.5 mm after installation. Since the sections of compressive foam 406 are compressed, they form a tight seal between the light guide 430 and the mirror. This seal prevents light emanating from the front surface 434 from being projected outward into the rear surface of the mirror, thereby improving lighting efficiency.

The light source 440 includes an LED array 442 affixed to a printed circuit board (PCB) 444 providing electrical contacts between elements of the LED array 442 and controller (e.g., the controller 140 described with respect to FIG. 1). In various embodiments, the PCB 444 is attached to a second surface 412 of the housing 402 via a section of thermally conductive tape. The thermally conductive tape facilitates heat generated via the LED array 442 being dissipated to the housing 402 to prevent overheating of the light source 440. As shown, the second surface 412 is substantially perpendicular to the first surface 404 attached to the light guide 430. The PCB 444 is substantially parallelepiped shape (e.g., having a thickness of approximately 1.5 mm and a width of approximately 7 mm) such that an emission surface of the LED array 442 is substantially parallel to an end surface 436 of the light guide 430.

As shown in FIG. 4, with the sections of compressive foam 406 in an uncompressed state, a portion of the LED array 442 is aligned with the rear surface 432 of the light guide 430. However, once the lighting assembly 400 is attached to a mirror such that the sections of compressive foam 406 are placed into a compressed state (see, e.g., FIG. 8), the entirety of the emission surface of the LED array 442 is offset from the rear surface 432 of the light guide 430 such that light emitted by the LED array 442 refracts into the light guide 430 via the end surface 436. The light guide 430 may contain irregularities and/or internal surfaces configured to direct light at various points of incidence towards the front surface 434, resulting in a luminous flux being emitted from the front surface 434. The structure of the light guide 430 is described below in more detail with respect to FIGS. 6-7.

In the example shown, the housing 402 includes a rear panel 414 having first and second mounting portions 416 and 420 extending therefrom. The first mounting portion 416 includes a screw boss feature 418 configured to receive an attachment screw for a reflective end cap for the light guide 430. For example, the reflective end cap may surround an end surface 438 of the light guide 430 opposite to the end surface 436. An inner surface of the reflective end cap may have a reflective coating applied thereto such that light is re-directed back into the light guide 430. In some embodiments, the reflective end cap and/or screw boss feature 418 is omitted. The first mounting portion 416 also includes a side panel extending substantially perpendicular to the rear panel 414.

The second mounting portion 420 includes a number (e.g., 2) of segments extending substantially parallel to the rear panel 414. The segments are spaced apart from one another such that cavities are formed between them. As such, both the first mounting portion 416 and second mounting portion 420 include sections that are hollowed out of material (e.g., aluminum) thus saving material and rendering the housing 402 lighter weight than if solid volumes of material were used for the mounting portions 416 and 420.

Sections of thermally conductive tape 422 are applied to the rear surface 410 on the rear panel 414 adjacent to the first and second mounting portions 416 and 420. The sections of thermally conductive tape 422 attach the housing to a mounting structure used to attach the lighting assembly 400 to a mirror. The mounting structure is described in more detail with respect to FIG. 8.

Figure 5:
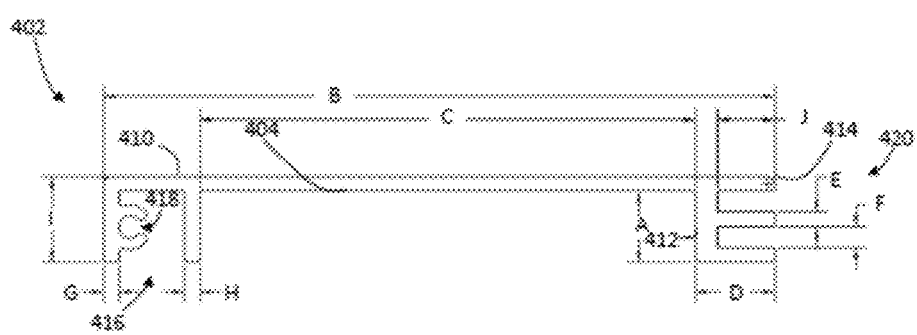
FIG. 5 is a schematic diagram of a housing of the lighting assembly shown in FIG. 4.

Referring now to FIG. 5, a schematic diagram illustrating various dimensional aspects of the housing 402 is shown, according to an example embodiment (according to various other exemplary embodiments, the dimensions may differ). As shown, the rear panel 414 and outer surfaces of the first and second mounting portions 416 and 420 define a cavity for receiving the light guide 430. The cavity has a width C and a depth A. In an example embodiment, C is approximately 51 mm (e.g., 51.1 mm) and A is approximately 7 mm (e.g., 7.2 mm). In an embodiment, the light guide 430 is of lesser dimensions than the cavity by a predetermined amount (e.g., approximately 43 mm by approximately 6 mm).

The housing 402 has an overall width B (e.g., a distance between outer surfaces of the first and second mounting portions 416 and 420) of approximately 69 mm (e.g., 69.1 mm) and an overall depth I of approximately 9 mm (e.g., 8.7 mm). Also as shown, the second mounting portion 420 has width D (e.g., a distance between the second surface 412 and an outer surface) of approximately 8 mm (e.g., 8.1 mm). The segments of the second mounting portion have a length J of approximately 6 mm (e.g., 5.9 mm). As a result, a panel of the second mounting portion 420 extending perpendicularly to the rear panel 414 (e.g., defining the second surface 412) has a thickness of approximately 2 mm (e.g., 2.2 mm).

In various embodiments, various panels of the housing 402 (e.g., the rear panel 414, panels of the first mounting portion 416, the segments of the second mounting portion 420, etc.) have wall thicknesses E, F, G, and H. In some embodiments, the wall thicknesses E, F, G, and H are substantially equal to one another. For example, in one embodiment, the wall thicknesses E, F, G, and H are approximately 1.5 mm thick. Corners defining boundaries between the various panels may also be rounded at a radius of curvature of approximately 0.4 mm. The rounded corners prevent wear and tear of objects (e.g., the mirror, mounting, structure) attached to the housing 402.

Figure 6:
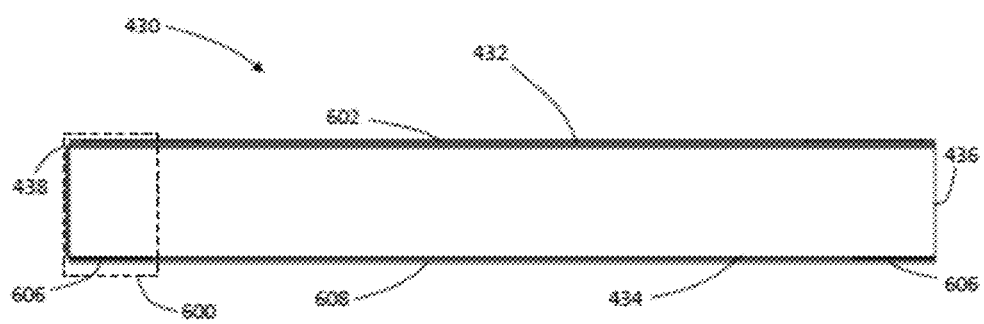
FIG. 6 is a perspective view of a light guide of the lighting assembly shown in FIG. 4.
Figure 7:
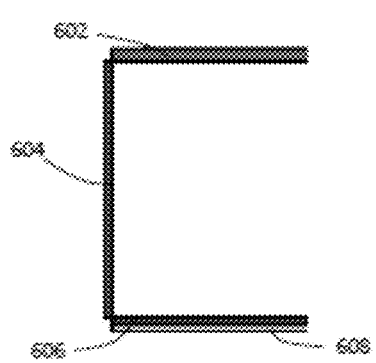
FIG. 7 is a close-up view of the portion of the light guide shown in FIG. 6.

Referring now to FIG. 6, a perspective view of the light guide 430 of the lighting assembly 400 is shown, according to an example embodiment. FIG. 7 shows a close-up view of a portion 600 of the light guide 430. As shown, the light guide 430 has a layer of reflective back material 602 on the rear surface 432 to reflect light towards the front surface 434. The end surface 438 has a reflective layer 604 disposed thereon to contain light refracting through the light guide 430. In one embodiment, for example, the reflective layer includes a reflective tape that extends the entirety of the end surface 438. In some embodiments, the reflective back material 602 and the reflective layer 604 are constructed of the same reflective materials. In alternative embodiments, the reflective back material 602 and reflective layer 604 are constructed of different materials. For example, in one embodiment, the reflective layer 604 includes an adhesive applied to the entirety thereof to ensure a tight bond to the light guide 430. The reflective layer 602, in contrast, may include an adhesive disposed only at peripheral portions thereof. In some embodiments, portions of the front surface 434 are also covered by sections 606 of reflective tape. For example, the sections 606 may both extend a predetermined distance from the end surfaces 436 and 438. In one embodiment, the predetermined distance is approximately 4 mm. As described with respect to FIG. 8, in one embodiment, when the lighting assembly 400 is mounted to a mirror, the sections 606 are aligned with a reflective portion of the mirror and pressed against a rear surface of the mirror such that the sections 606 prevent light from being directed into the rear surface of the mirror and wasted.

The light guide 430 also includes a thin film diffuser 608 disposed on the front surface 434. In the example shown, the thin film diffuser 608 is disposed over the sections 606 of reflective tape. The thin film diffuser 608 includes features (e.g., a rough texture) configured to scatter incidental light to provide an overlying transparent portion of a mirror with a white appearance. In the example shown, all of the light guide 430 except the end surface 436 disposed proximate to the light source 440 and a central portion of the front surface 434 is covered (or substantially covered) with some form of reflective material. As such, a vast majority of the light entering via the end surface 436 is emitted via the central portion of the front surface 434, efficiently illuminating areas in front of a reflective portion of an associated mirror.

Figure 8:
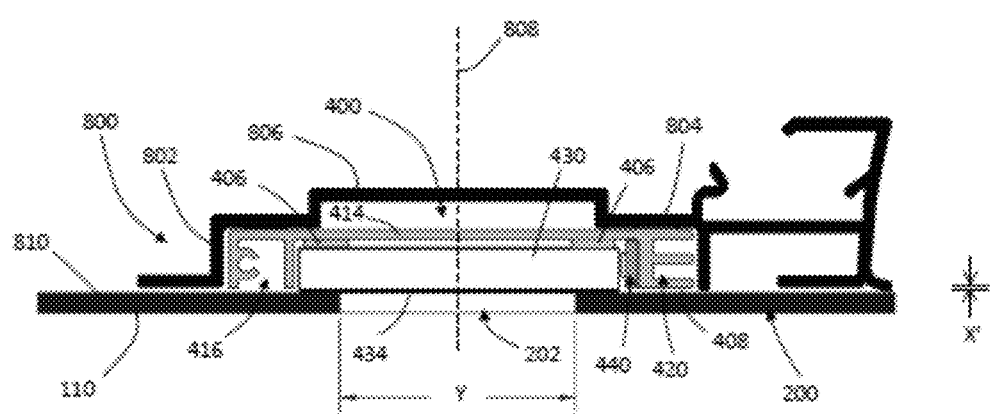
FIG. 8 is a perspective view of a mirror including a lighting assembly.

Referring now to FIG. 8, a cross-sectional view of a mirror including a lighting assembly is shown, according to an example embodiment. The example shown in FIG. 8 includes the mirror 110 described with respect to FIGS. 1-2, the lighting assembly 400 described with respect to FIGS. 4-7, and a mounting structure 800 for coupling the lighting assembly 400 to the mirror 110. Accordingly, FIG. 8 may include reference numerals already described herein with respect to FIGS. 1-7 to indicate the inclusion of corresponding elements.

As shown, the mounting structure 800 includes portions 802 and 804 having inner surfaces that substantially correspond to outer surfaces of the first and second mounting portions 416 and 420 of the housing 402. As shown, the portions 802 and 804 both include a first segment extending substantially perpendicular from a rear surface 810 of the mirror 110 and a second segment extending inwardly from the first segment towards a central axis 808 of the transparent portion 202 substantially parallel to the rear panel 414. In various embodiments, in regions of overlap between the second segments of the portions 802 and 804 and the rear panel 414, sections of double-sided thermally conductive tape (e.g., the sections of thermally conductive tape 422 described with respect to FIG. 4) are used to fix the housing 402 to the mounting structure 800.

Mounting structure 800 also includes a central portion 806 interconnecting the portions 802 and 804. The central portion 806 is offset from the portions 802 and 804 in the direction of the central axis 808 so as to form a gap between the central portion 806 and the rear panel 414. The gap may house additional components (e.g., wiring) of the lighting assembly 400. Central portion 806 is disposed such that a distance between the first segments of the portions 802 and 804 substantially corresponds to an overall width (e.g., the overall width B described with respect to FIG. 5) of the housing 402. As such, the housing 402 is tightly secured via the portions 802 and 804 to ensure the maintenance of proper alignment between the light guide 430 and the transparent portion 202. Additionally, the mounting structure 800 includes additional segments that extend substantially parallel the rear surface 810. Such additional segments may be attached to the rear surface 810 (e.g., via fasteners or an adhesive) to secure the mounting structure 800 to the mirror 110.

As shown, the mounting structure 800 is positioned on the rear surface 810 such that the light guide 430 is centered within the transparent portion 202. Peripheral portions of the of the light guide 430 (e.g., of the front surface 434) abut the rear surface 810 in regions opposing the reflective portion 200 of the mirror 110. As a result of the contact between the front surface 434 and the rear surface 810, segments of compressive foam 406 attaching the light guide 430 to the housing 402 are compressed, reducing a thickness X' of the offset between the front surface 408 of the housing 402 and front surface 434 of the light guide 430 (e.g., from the thickness X described with respect to FIG. 4). For example, in some embodiments, the offset reduces by approximately 50% (e.g., from 1.3 mm to 0.7 mm). Thus, the light guide 430 is closer to the rear panel 414 by the amount of reduction in the offset. Given this, the center of the light guide 430 is more closely aligned with the center of the light source 440, facilitating light emitted by the light source 440 entering the light guide 430. Additionally, since the front surface 434 of the light guide 430 is pressed directly into contact with the rear surface 810 of the mirror 110, minimal light emanating from the front surface 434 escapes at the interface between the light guide 430 and the mirror 110.

In some embodiments, the peripheral portions of the front surface 434 that abut the rear surface 810 are covered with a reflective material (e.g., the sections 606 of reflective tape described with respect to FIGS. 6-7) to prevent light from being directed into non-transparent portions of the rear surface 810. While not shown in FIG. 8, in some embodiments, the transparent portion 202 of the mirror 110 also includes the border region 206 described with respect to FIG. 2, where a rear surface of the transparent portion 202 is processed to provide an appearance of a frosted boundary. As will be appreciated, in various embodiments, the mirror 110 may include additional lighting assemblies similar to the lighting assembly 400 disposed at other regions thereof. For example, in one embodiment, the mirror 110 includes an additional lighting assembly and mounting structure disposed rearward of the transparent portion 204 described with respect to FIG. 2.

Figure 9:
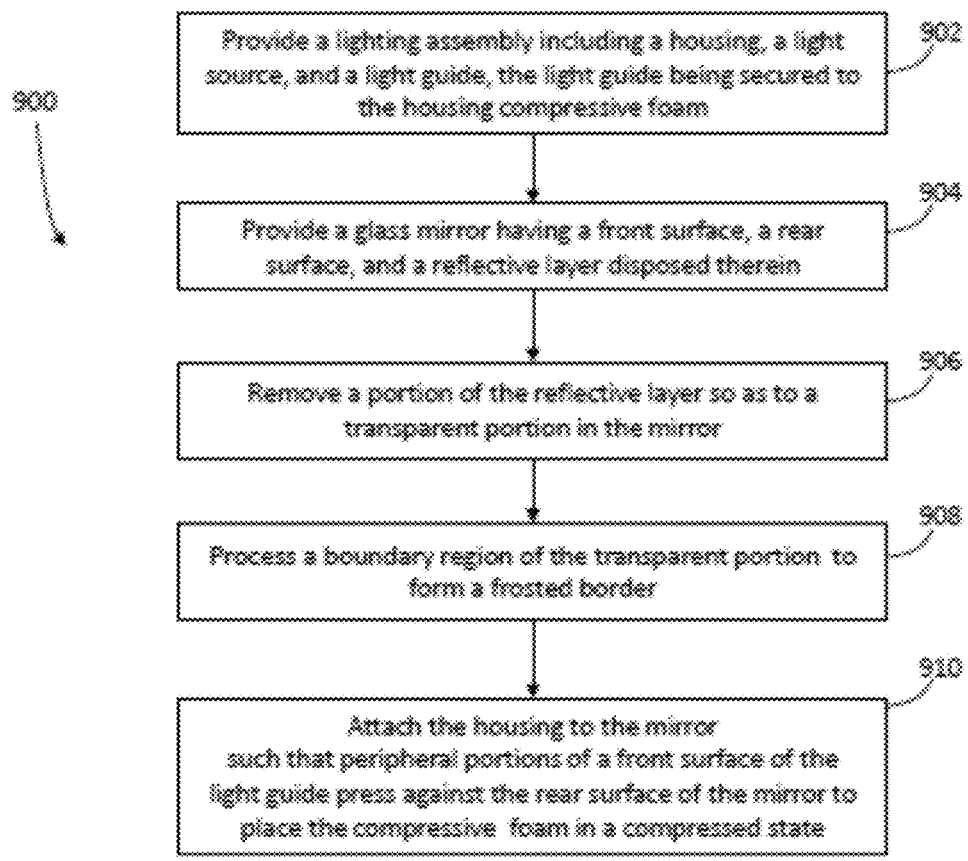
FIG. 9 is a flow diagram of a method of assembling a mirror including a lighting assembly, according to an example embodiment.

Referring now to FIG. 9, a flow diagram of a method 900 of assembling a mirror including a lighting assembly is shown, according to an example embodiment. In an operation 902, a lighting assembly including a housing, a light source, and a light guide is provided. The light guide is secured to a first surface the housing via a compressive foam. In various embodiments, the light guide is an edge-lit light guide, and secured to the housing such that the light source is proximate to an end thereof. The light source may include an array of LEDS mounted on a PCB attached to the housing. In an embodiment, the light source is attached to the second surface of housing (e.g., via a section of thermally conductive tape) having an angular relationship (e.g., perpendicular to) to the first surface. In some embodiments, the housing is aluminum and serves as a heatsink for head generated by the light source.

In some embodiments, additional operations are performed on individual elements of the lighting assembly. For example, reflective coatings or tape may be applied to every surface of the light guide except for the end to be proximate to the light source once attached to the housing via the compressive foam. Portions of a front surface of the light guide may be covered with a reflective layer. The portions may extend inwardly from ends of the light guide towards a central axis of the light guide by a predetermined distance. The predetermined distance may correspond to half of a difference in dimension (e.g., length, width, etc.) between the light guide and a transparent portion of the mirror as described herein. Additionally, the front surface of the light guide may have a thin film diffuser applied thereto. The provided lighting assembly may be the lighting assembly 400 described with respect to FIGS. 4-7.

In an operation 904, a glass mirror having a front surface, a rear surface, and a reflective layer is provided. The mirror may be of any suitable shape. For example, in some embodiments, the mirror is substantially rectangular-shaped. In other alternative embodiments, the mirror is of a rounded shape. The mirror may be constructed from a number of different layers. For example, in some embodiments, the mirror may include, a non-reflective rear panel, a reflective layer, and a transparent glass layer.

In an operation 906, a portion of the reflective layer in the mirror is removed so as to create a transparent portion in the mirror. For example, the rear panel may first be stripped from a region of the mirror to expose the reflective layer. In various embodiments, an outer boundary of the region from which the rear panel is stripped is selected based on the light guide provided at 902. For example, the outer boundary may be of a shape that corresponds to an outer circumference of the light guide. In one embodiment, both the light guide and the outer boundary are substantially rectangular-shaped. The dimensions of the region and the light guide may also bear a relationship to one another. For example, in one embodiment, the region from which the rear panel is stripped is of a smaller dimension (e.g., width) than the light guide. After the rear panel is removed to expose the reflective layer in the region, the reflective layer is also stripped within the region to expose the transparent glass layer from the rear surface of the mirror. Resulting is a transparent window within the mirror having a predetermined shape. In various embodiments, the preceding operations are repeated to create a number of additional transparent portions for any additional lighting assemblies to be included in the assembled mirror.

In an operation 908, a boundary of the transparent portion is processed to form a frosted border. For example, a rear surface of the transparent glass layer may be roughened at the boundary of the transparent portion. As a result of the roughening, light incident on the frosted border is scattered to provide a whitened appearance. Such a process may be repeated for any additional transparent portions of the mirror. For example, the resulting mirror may be similar in appearance to the mirror 110 described with respect to FIGS. 1-2. In some embodiments, the operation 908 is omitted.

In an operation 910, the light guide is attached to the mirror such that peripheral portions of a front surface of the light guide press against the rear surface of the mirror to place the compressive foam in a compressed state. For example, in some embodiments, the light guide is secured to a mounting structure (such as the mounting structure 800 described with respect to FIG. 8). The housing may be secured to the mounting structure via thermally conductive tape to facilitate the dissipation of heat resulting from the light source. The mounting structure may then be attached to the rear surface of the mirror such that the light guide is aligned with respect to a transparent portion of the mirror. In an example, the light guide is centered with respect to the transparent portion. As such, since the transparent portion has lesser dimensions than the light guide, similarly-dimensioned peripheral portions of the lightguide will extend beyond a boundary between the transparent and reflective portions of the mirror. In other words, the peripheral portions of the light guide oppose the reflective portions of the mirror.

The peripheral portions of the light guide press against the rear surface of the mirror so as to place the compressive foam in a compressed state. As a result, an overall dimension (e.g., depth, thickness, distance between a rearmost portion of the housing and front-most surface of the light guide, etc.) of the lighting assembly is reduced. Such a reduction results in an alignment between an end surface of the light guide and the light source. For example, in one embodiment, when the foam is not in a compressed state, at least a portion of an LED array of the light source is aligned with a rear surface of the light guide. However, after the compressive foam is placed into a compressed state at 910, no portion of the LED array is aligned with the rear surface of the light guide. Light emitted by the LED array thus refracts through the end surface of the light guide so as to generate a luminous flux emitted at the front surface of the light guide. Additionally, since the front surface of the light guide is directly in contact with the rear surface of the mirror, luminous flux is prevented from escaping at an interface between the light guide and mirror, thereby improving the overall efficiency of the lighting assembly.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the mirror assembly as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" or as an "example" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A method for assembling a mirror including a lighting assembly, the method comprising:
    securing a light guide to a housing with a compressive foam having an adhesive applied thereto such that a first end of the light guide is proximate to a light source;
    providing a mirror including a first portion and a second portion, wherein the first portion of the mirror has a first reflectivity and the second portion of the mirror has a second reflectivity, the first reflectivity being higher than the second reflectivity; and
    attaching the housing to the mirror, wherein attaching the housing to the mirror includes pressing a peripheral portion of the light guide to a boundary region of the first portion of the mirror, thereby placing the compressive foam into a compressed state such that a relative positioning of the light guide and the light source changes.

2. The method of claim 1, wherein the compressive foam comprises multiple sections of compressive foam that are separate from one another.

3. The method of claim 2, wherein the compressive foam comprises a first section of compressive foam disposed proximate to the first end of the light guide and a second section of compressive foam disposed proximate to a second end of the light guide.

4. The method of claim 1, wherein, prior to attaching the housing to the mirror, a front surface of the light guide is displaced from a front surface of the housing by a first nonzero distance; and
    wherein, after attaching the housing to the mirror, the front surface of the light guide is displaced from the front surface of the housing by a second nonzero distance that is less than the first nonzero distance.

5. The method of claim 4, wherein, after attaching the housing to the mirror, the front surface of the light guide abuts a rear surface of the mirror such that there is a gap between the front surface of the housing and the rear surface of the mirror.

6. The method of claim 1, wherein a width of the light guide is greater than a width of the second portion of the mirror; and
    wherein the light guide is centered within the second portion of the mirror such that a front surface of the light guide includes two overlapping regions that contact the first portion of the mirror.

7. The method of claim 6, further comprising, prior to attaching the housing to the mirror, disposing a reflective layer at the two overlapping portions of the light guide.

8. The method of claim 7, further comprising, after disposing the reflective layer, disposing a thin film diffuser on the front surface of the light guide.

9. A mirror comprising:
    a glass layer having a front surface and a rear surface;
    a reflective layer disposed on the rear surface of the glass layer, wherein the reflective layer includes a first opening exposing the rear surface of the glass layer inward of a first boundary;
    a mounting structure for a lighting assembly disposed rearward of the rear surface of the glass layer, the mounting structure including a surface substantially enclosing a volume;
    a housing attached to the surface of the mounting structure and disposed within the volume;
    a light source affixed to a first surface of the housing; and
    a light guide affixed to a second surface of the housing by a section of compressible foam, the section of compressible foam having a first adhesive layer affixed to the housing and a second adhesive layer affixed to the light guide, wherein a first end surface of the light guide is proximate to the light source.

10. The mirror of claim 9, wherein the first boundary includes a first linear portion and a second linear portion, the first linear portion being substantially parallel to the second linear portion and separated therefrom by a nonzero distance.

11. The mirror of claim 10, wherein the light guide is of a width that is greater than the nonzero distance such that the light guide includes two regions that extend beyond the first boundary.

12. The mirror of claim 11, wherein the light guide includes a first reflective layer disposed at the two regions.

13. The mirror of claim 11, wherein the light guide includes a second reflective layer at a second end surface of the light guide, the second end surface of the light guide opposing the first end surface of the light guide.

14. The mirror of claim 11, wherein the first surface of the housing is substantially perpendicular to the second surface of the housing.

15. A mirror comprising:
    a reflective portion;
    a first transparent portion;
    a second transparent portion;
    first and second housings affixed to a rear surface of the mirror;
    light sources attached to the first and second housings;
    light guides attached to the first and second housings such that portions of front surfaces of the light guides align with the first and second transparent portions; and
    sections of compressive foam disposed between the light guides and surfaces of the first and second housings, where the front surfaces of the light guides abut against the rear surface of the mirror to compress the sections of compressive foam.

16. The mirror of claim 15, wherein the first transparent portion and the second transparent portion are each substantially rectangular and displaced from a perimeter of the mirror.

17. The mirror of claim 15, wherein the light sources include a plurality of light emitting diodes.

18. The method of claim 1, further comprising, prior to providing the mirror including the first portion and the second portion:
    providing a transparent glass layer of the mirror with a reflective layer; and
    removing at least some of the reflective layer from at least some of the transparent glass layer of the mirror to form the first portion of the mirror and the second portion of the mirror;

wherein the reflective layer has the first reflectivity; and
wherein the transparent glass layer of the mirror has the second reflectivity.

19. The method of claim 18, further comprising roughing a region of the second portion of the mirror.

20. The method of claim 19, wherein the region of the second portion of the mirror is a border of the second portion of the mirror.

* * * * *